UNITED STATES PATENT OFFICE.

JACOB REESE, OF PITTSBURG, PENNSYLVANIA.

PROCESS OF MAKING PHOSPHATES.

SPECIFICATION forming part of Letters Patent No. 412,793, dated October 15, 1889.

Application filed September 23, 1887. Serial No. 250,480. (No specimens.)

*To all whom it may concern:*

Be it known that I, JACOB REESE, a citizen of the United States, residing at Pittsburg, in the county of Allegheny and State of Pennsylvania, have invented a new and useful Improvement in the Production of Calcium Phosphates; and I hereby declare the following to be a full, clear, and exact description thereof, which will enable others skilled in the art to which it appertains to make and use the same.

This invention relates to the manufacture of calcium phosphates from phosphoritic iron. This has been done before by my invention known as the "basic process," by which process a phosphide of iron in a molten state is blown with an air-blast while in the presence of lime until the phosphorus is eliminated from the metal and deposited in the lime as a phosphate; but in the practice of that process a large amount of iron is also oxidized and deposited in the lime as oxide of iron. This iron is not only a total loss, but it is injurious to the phosphate.

The object of this invention is to prevent this difficulty and produce a calcium phosphate from phosphoritic iron, having less iron oxides than can be produced by the basic process.

I have discovered that when molten phosphoric iron is blown with an air-blast while in the presence of lime but little iron is oxidized until the phosphorus is reduced below one-half of one (.5) per cent., and that while the phosphorus is being reduced from .50 to .04 the iron is also oxidized to a large extent. When the phosphorus in a certain blow had been reduced to .48, the lime contained 12.41 of phosphoric acid and only 5.02 of oxide of iron; but when the metal had been blown until the phosphorus was reduced to .04 the lime contained 12.80 phosphoric acid and 17.21 of oxide of iron. In another heat, when the phosphorus was reduced down to .93, the lime only contained 6.13 oxide of iron; but when the phosphorus was reduced to .04 the lime contained 15.10 of oxide of iron and 13.69 phosphoric acid. In another blow, when the phosphorus had been reduced down to .60, the lime contained 6.30 per cent. of iron and 13.10 per cent. of phosphoric acid; but when the phosphorus had been reduced to .04 the lime contained 15.42 per cent. of oxide of iron and 20.00 per cent. of phosphoric acid, which shows that the largest production of oxide of iron is when the phosphorus has been reduced below .5.

This invention consists in blowing phosphoritic molten iron with a blast of air while in the presence of lime until the phosphorus is oxidized and reduced to not less than one-half per cent. in the metal, and the phosphoric acid so formed is deposited in the lime, and then withdrawing the phosphate of lime so formed from the metal while the metal yet contains at least .5 of phosphorus, thus avoiding the deposit of oxide of iron while the last .5 of phosphorus is being eliminated.

The invention also consists in stopping the blow before the phosphorus has been reduced below one-half of one per cent.

In the practice of this invention I prefer to use metal containing from three to ten per cent. of phosphorus. The metal may be melted in a cupola and run into a converter having a lime or metal water-jacketed lining, and therein blown with an air-blast while in the presence of lime additions until the lime is saturated with phosphoric acid to the degree desired. When the lime has been so charged with phosphoric acid, the vessel is turned over, the blow stopped, and the lime withdrawn. A fresh charge of lime may then be put in the converter, the vessel turned up, and the blow continued until the lime is saturated with phosphoric acid or until the phosphorus in the metal has been reduced down to .5, when the vessel is again turned down and the lime withdrawn, care being taken to stop the blow before the phosphorous in the metal is reduced below .5. When the phosphorus in the metal has been reduced to or nearly to .5, the metal should be withdrawn and a fresh charge of high phosphorus iron charged.

In ordinary practice the phosphorus will be oxidized and deposited in the lime as phosphoric acid at the rate of one per cent. per minute after the carbon has disappeared, so that when the charge is ten thousand pounds, containing seven per cent. of phosphorus, a three-minute blow will reduce the phosphorus to four (4) per cent. Then if the lime is withdrawn and a fresh supply charged and the metal is again blown three minutes the phosphorus will be reduced to one per cent. The metal may then be withdrawn and a fresh charge made.

When the charge is ten thousand pounds, as before stated, and three per cent. of phosphorus is oxidized to phosphoric acid and deposited in the lime, the amount of lime required may be determined thus: three per cent. of ten thousand is three hundred pounds. This, when oxidized, will produce six hundred and thirty-seven pounds phosphoric acid, and in producing a twenty-five per cent. phosphate six hundred and eighty-seven multiplied by three will give the amount of lime, two thousand and sixty-one pounds, required, which will produce, with the waste of the lining, about three thousand pounds of phosphate to the blow, or one thousand pounds from every one per cent. phosphorus blown from a charge of ten thousand pounds of metal.

In the act of blowing air through molten iron while held in a lime-lined vessel and in the presence of lime additions, silicon is first oxidized, then carbon is attacked. When the carbon has been reduced to about .15, the phosphorus is rapidly oxidized, and when the phosphorus has been reduced to about .50 the iron is attacked and is rapidly oxidized. Now, in order to prevent the oxidation of iron as much as possible, care should be taken to stop the blow before the phosphorus is reduced below .50. The time can be determined by calculating the degree of dephosphorization per cubic foot of blast blown in. It may also generally be determined by the appearance of brown smoke at the mouth of the converter, which is an indication that the iron is being oxidized. When the brown smoke appears, the blast should be stopped immediately and the lime withdrawn.

In the practice of this invention I do not propose making steel, nor do I propose eliminating phosphorus below .5. The metal so made will be of great service as a foundry-iron. It will be free from silicon, and will have .5 of phosphorus, and when it is again melted in the foundry-cupola it will absorb about three per cent. of carbon chemically combined, which, with the phosphorus, will give it great fluidity, and make it very desirable for casting stoves and other work requiring fluid-iron.

What I claim as my invention is—

1. The process of producing calcium phosphates, which consists in blowing molten phosphoritic iron with an air-blast while held in a basic-lined vessel, and in the presence of lime additions until the phosphorus has been reduced to not less than one-half of one per cent., then withdrawing the phosphate so formed from the presence of the metal.

2. The process of producing calcium phosphates, which consists in blowing molten phosphoritic iron with an air-blast while held in a basic-lined vessel, and in the presence of lime additions until the desired amount of phosphorus is oxidized to phosphoric acid and held in the lime as a phosphate, then stopping the blast and removing the phosphate while the metal still contains not less than one-half of one per cent. of phosphorus.

3. In the manufacture of calcium phosphate from phosphoritic iron by oxidizing the phosphorus with an air-blast while the metal is in a molten state and held in a basic-lined vessel in the presence of lime additions, the method of withdrawing the lime from the vessel after it has been charged to the desired degree with phosphoric acid, and then recharging fresh lime, whereby phosphates having any desired percentage of phosphoric acid may be produced.

4. In the manufacture of calcium phosphates from phosphoritic iron by oxidation with an air-blast, the method of preventing the deposit of a large amount of oxide of iron in the phosphate, which consists in stopping the blast and withdrawing the phosphate from the vessel before the phosphorus has been reduced in the metal below one-half of one per cent., (.5 per cent.,) whereby the large amount of oxide of iron produced while the last .5 per cent. of phosphorus is eliminated is prevented from entering the phosphate.

JACOB REESE.

Witnesses:
WALTER REESE,
C. C. LEE.